United States Patent
Ye

(10) Patent No.: US 11,284,037 B2
(45) Date of Patent: Mar. 22, 2022

(54) DIGITAL VIDEO RECORDERS AND METHODS OF USE THEREOF

(71) Applicant: ZHEJIANG DAHUA TECHNOLOGY CO., LTD., Hangzhou (CN)

(72) Inventor: Xin Ye, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 17/233,606

(22) Filed: Apr. 19, 2021

(65) Prior Publication Data

US 2021/0243405 A1    Aug. 5, 2021

Related U.S. Application Data

(63) Continuation of application No. PCT/CN2019/102036, filed on Aug. 22, 2019.

(30) Foreign Application Priority Data

Oct. 19, 2018 (CN) .......................... 201811222123.4

(51) Int. Cl.
*H04N 5/775* (2006.01)
*G06F 1/18* (2006.01)
*H04N 7/18* (2006.01)

(52) U.S. Cl.
CPC ............. *H04N 5/775* (2013.01); *G06F 1/189* (2013.01); *H04N 7/183* (2013.01)

(58) Field of Classification Search
CPC .................................................. H04N 5/775
USPC ....................................................... 386/291
See application file for complete search history.

(56) References Cited

U.S. PATENT DOCUMENTS

| 2010/0194200 | A1 | 8/2010 | Kwon et al. | |
| 2013/0187445 | A1* | 7/2013 | Mutzabaugh | H04B 3/548 307/1 |
| 2014/0023339 | A1* | 1/2014 | Takahashi | H04N 5/76 386/230 |

FOREIGN PATENT DOCUMENTS

| CN | 203984540 U | 12/2014 |
| CN | 104345659 A | 2/2015 |
| CN | 204145644 U | 2/2015 |
| CN | 104994269 A | 10/2015 |

(Continued)

OTHER PUBLICATIONS

International Search Report in PCT/ON2019/102036 dated Nov. 20, 2019, 4 pages.

(Continued)

*Primary Examiner* — Daniel T Tekle
(74) *Attorney, Agent, or Firm* — Metis IP LLC

(57) ABSTRACT

A Digital Video Recorder (DVR) for storing video data received from an imaging device and a method thereof are provided in the present disclosure. The DVR includes a communication port configured to connect to the imaging device. The DVR also includes a processing module configured to determine whether the DVR receives video data from the imaging device through the communication port and a detection module configured to acquire an operating voltage of the imaging device. The DVR further includes a power supply switch configured to turn on or off a power supply to the imaging device based on a determination by the processing module and the operating voltage of the image device.

19 Claims, 8 Drawing Sheets

(56) References Cited

FOREIGN PATENT DOCUMENTS

| | | |
|---|---|---|
| CN | 106303342 A | 1/2017 |
| CN | 10733085 A | 11/2017 |
| CN | 207399379 U | 5/2018 |
| CN | 207677885 U | 7/2018 |
| KR | 20080002065 A | 1/2008 |
| KR | 20170087208 * | 5/2017 |
| KR | 20170087208 A | 7/2017 |

OTHER PUBLICATIONS

Written Opinion in PCT/CN2019/102036 dated Nov. 20, 2019, 4 pages.
The Extended European Search Report in European Application No. 19873739.7 dated Oct. 14, 2021, 8 pages.
First Office Action in Chinese Application No. 201811222123.4 dated Nov. 26, 2021, 13 pages.

* cited by examiner

Processor
311

Processing module
410

Detection Module
420

Power Supply Switch
430

Mode Switch Module
440

FIG. 4

DIGITAL VIDEO RECORDERS AND METHODS OF USE THEREOF

CROSS REFERENCE

This application is a Continuation of International Application No. PCT/CN2019/102036, filed on Aug. 22, 2019, which claims priority of Chinese Patent Application No. 201811222123.4 filed on Oct. 19, 2018, the entire contents of each of which are hereby incorporated by reference.

TECHNICAL FIELD

This disclosure generally relates to methods and systems for video monitoring and video recording, and more particularly, to a Digital Video Recorder (DVR) and a method of using the DVR.

BACKGROUND

Generally, there are two kinds of cameras used in video monitoring, one is power over coaxial (POC) camera which can be powered with a coaxial cable (capable of using coaxial power supply), and the other is non-POC camera which can be powered with a separate power adapter (incapable of using coaxial power supply). Therefore, there are two kinds of Digital Video Recorders (DVR) corresponding to the two kinds of cameras. The first kind can connect to a POC camera and provide power supply to the POC camera via a coaxial cable. The second kind cannot provide coaxial power supply when connected to a non-POC camera, and the non-POC camera gets its power supply from a separate power source. To use any particular camera with a DVR, a user must identify what kind of camera it is and then determine a corresponding DVR for connecting to the camera. This process is cumbersome and inefficient. And if a camera is connected to a wrong DVR (e.g., a POC camera connected to the second kind of DVR, or a non-POC camera connected to the first kind of DVR), the camera wouldn't work and might even be damaged. Thus, there is a need to provide a DVR that is capable of both kinds of cameras.

SUMMARY

Embodiments of the present disclosure provide a Digital Video Recorder (DVR) for storing video data received from an imaging device and a method thereof. Specifically, it may include the following aspects.

In a first aspect, the present disclosure discloses a DVR for storing video data received from an imaging device. The DVR may include a communication port configured to connect to the imaging device. The DVR may also include a processing module configured to determine whether the DVR receives video data from the imaging device through the communication port and a detection module configured to acquire an operating voltage of the imaging device. The DVR may further include a power supply switch configured to turn on or off a power supply to the imaging device based on a determination by the processing module and the operating voltage of the image device.

In some embodiments, the communication port connects to the imaging device via a coaxial cable or a wireless network.

In some embodiment, the DVR may further include a mode switch module configured to switch to a power supply mode or a non-power supply mode.

In some embodiments, the processing module may include an A/D conversion unit configured to convert analog video data to digital video data.

In some embodiments, the processing module may include a main control unit (MCU) and a single chip microcomputer (SCM), the MCU configured to determine whether the DVR receives the video data.

In some embodiments, the MCU may be further configured to process the video data.

In some embodiments, the SCM may be configured to control the power supply switch to reset to turn off if the MCU determines that the DVR fails to receive the video data.

In some embodiments, the SCM may be configured to control the mode switch module to reset to the non-power supply mode.

In some embodiments, the SCM may be configured to control the detection module to acquire the voltage of the imaging device if the MCU determines that the DVR fails to receive the video data and determine whether the voltage of the imaging device is within the predetermined voltage range.

In some embodiments, the SCM may be configured to control the power supply switch to turn on if the SCM determines that the voltage of the imaging device is within the predetermined voltage range.

In some embodiments, the SCM may be configured to control the mode switch module to switch to the power supply mode.

In some embodiments, the detection module may include a Metal Oxide Semi-Conductor Field Effect Transistor (MOS FET), a first resistor, a diode, a capacitor, and a first power source. A gate of the MOS FET may connect to the processing module. A source of the MOS FET may connect to the first power source. A drain of the MOS FET may connect to a first end of the first resistor. A second end of the first resistor may connect to an anode of the diode. A cathode of the diode may connect to a first connection node between the communication port and the capacitor.

In some embodiments, the mode switch module may include a second resistor, a first triode, a third resistor, a fourth resistor, a second triode, a fifth resistor, a third triode, a sixth resistor, and a second power source. A first end of the second resistor may connect to the first connection node, and a second end of the second resistor connects to a collector of the first triode. An emitter of the first triode is grounded and a base of the first triode connects to a first end of the third resistor. A second end of the third resistor connects to a first end of the fourth resistor. A second connection node between the third resistor and the fourth resistor connects to the processing module. A second end of the fourth resistor connects to a base of the second triode. An emitter of the second triode is grounded, and a collector of the second triode connects to a first end of the fifth resistor. A second end of the fifth resistor connects to the second power source. A third connection node between the collector of the second triode and the fifth resistor connects to a base of the third triode. An emitter of the third triode is grounded, and a collector of the third triode connects to a first end of the sixth resistor. A second end of the sixth resistor connects to a fourth connection node between the processing module and the capacitor.

In some embodiments, the non-power supply mode may include that ground the video data at the first connection node via the second resistor, and the power supply mode may include that ground the video data at the fourth connection node via the sixth resistor.

In some embodiments, a first resistance of the second resistor is the same with a second resistance of the sixth resistor.

In a second aspect, the present disclosure discloses a process implemented on a DVR for storing video data received from an imaging device. The process may include determining whether the DVR receives video data from the imaging device connected to the DVR. The process may also include acquiring an operating voltage of the imaging device when the DVR fails to receive the video data, and determining that the operating voltage of the imaging device is within a predetermined voltage range. The process may further include controlling the DVR to provide power supply to the imaging device.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein:

FIG. 4 is a schematic diagram of an exemplary processor according to some embodiments of the present disclosure;

DETAILED DESCRIPTION

Figure 1:
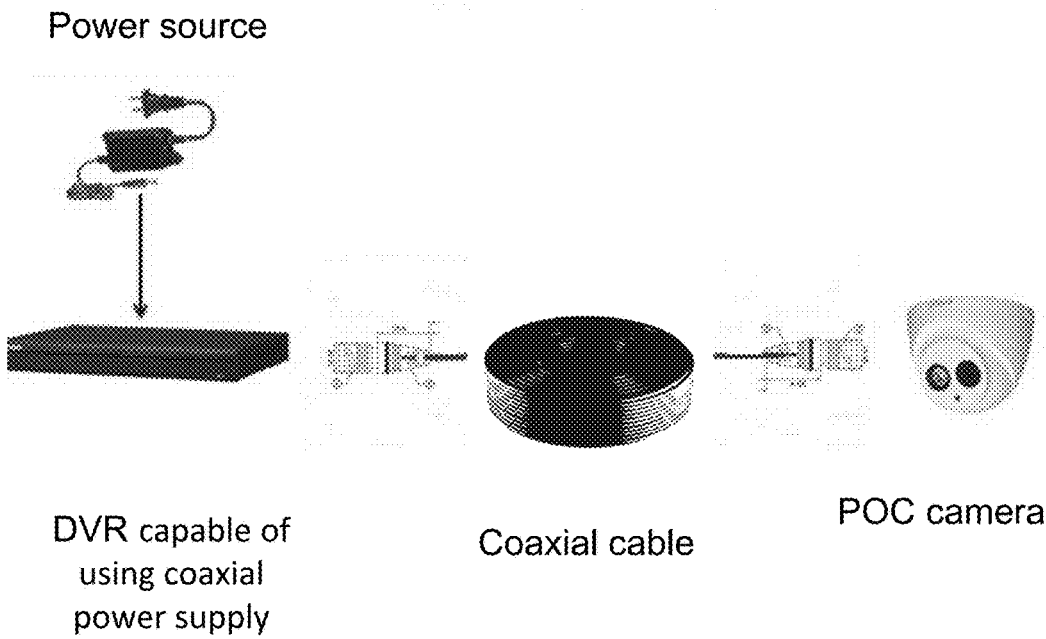
FIG. 1 is a schematic diagram illustrating an exemplary POC camera and a DVR capable of using coaxial power supply according to some embodiments of the present disclosure.

In order to illustrate the technical solutions related to the embodiments of the present disclosure, brief introduction of the drawings referred to in the description of the embodiments is provided below. Obviously, drawings described below are only some examples or embodiments of the present disclosure. Those having ordinary skills in the art, without further creative efforts, may apply the present disclosure to other similar scenarios according to these drawings. Unless stated otherwise or obvious from the context, the same reference numeral in the drawings refers to the same structure and operation.

As used in the disclosure and the appended claims, the singular forms "a," "an," and "the" include plural referents unless the content clearly dictates otherwise. It will be further understood that the terms "comprises," "comprising," "includes," and/or "including" when used in the disclosure, specify the presence of stated steps and elements, but do not preclude the presence or addition of one or more other steps and elements.

Some modules of the apparatus may be referred to in various ways according to some embodiments of the present disclosure, however, any number of different modules may be used and operated in the apparatus. These modules are intended to be illustrative, not intended to limit the scope of the present disclosure. Different modules may be used in different aspects of the apparatus and method.

According to some embodiments of the present disclosure, flow charts are used to illustrate the operations performed by the apparatus. It is to be expressly understood, the operations above or below may or may not be implemented in order. Conversely, the operations may be performed in inverted order, or simultaneously. Besides, one or more other operations may be added to the flowcharts, or one or more operations may be omitted from the flowchart.

An aspect of the present disclosure relates to apparatus and methods for providing power supply and receiving video data from an imaging device. The apparatus may include a communication port configured to connect to the imaging device. The apparatus may also include a processing module configured to determine whether the apparatus receives video data from the imaging device through the communication port and a detection module configured to acquire an operating voltage of the imaging device. The apparatus may further include a power supply switch configured to turn on or off a power supply to the imaging device based on a determination by the processing module and the operating voltage of the image device.

Figure 2:
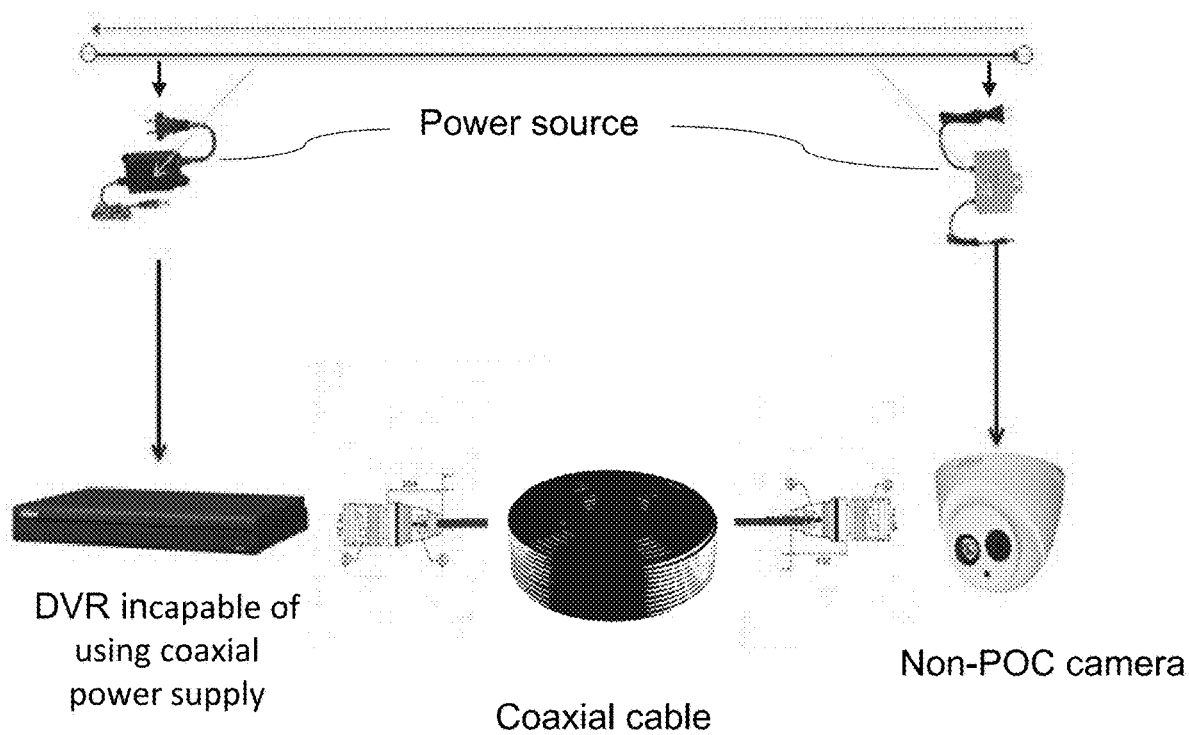
FIG. 2 is schematic diagram illustrating an exemplary non-POC camera and a DVR incapable of using coaxial power supply according to some embodiments of the present disclosure.

FIG. 1 shows a schematic diagram illustrating an exemplary POC camera and a DVR capable of using coaxial power supply according to some embodiments of the present disclosure. FIG. 2 is schematic diagram illustrating an exemplary non-POC camera and a DVR incapable of using coaxial power supply according to some embodiments of the present disclosure. As shown in FIG. 1, a POC camera and a first DVR capable of using coaxial power supply are connected via a coaxial cable. The first DVR connects to a power source (e.g., AC power via power adapter) to get power supply. The first DVR then supply power via the coaxial cable to the POC camera, and the POC camera can capture and transmit video data to the first DVR also via the coaxial cable.

FIG. 2 illustrates a non-POC camera and a second DVR incapable of using coaxial power supply being connected by a coaxial cable. The second DVR connects to a power source (e.g., AC power via a power adapter) to get power supply. The non-POC camera also connects to a power source (e.g., AC power via a power adapter) to get power supply. The non-POC camera can capture and transmit video data to the second DVR also via the coaxial cable.

Figure 3:
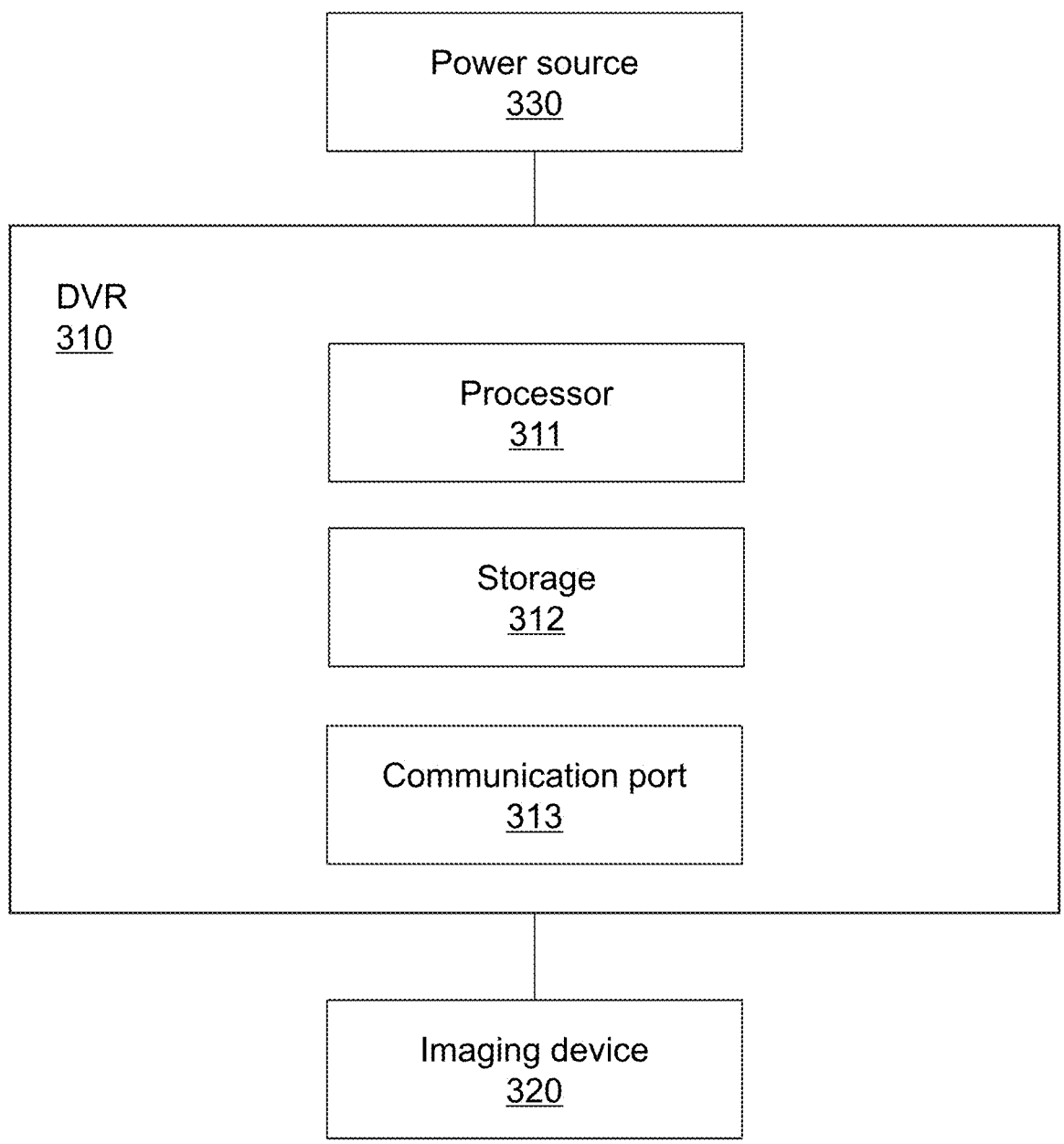
FIG. 3 is a schematic diagram illustrating an exemplary video surveillance system according to some embodiments of the present disclosure.

FIG. 3 is a schematic diagram illustrating an exemplary video surveillance system according to some embodiments of the present disclosure. The video surveillance system 300 may capture a video of an area and store the video. As illustrated in FIG. 3, the video surveillance system 300 may include a DVR 310 and an imaging device 320. The video surveillance system 300 may further include a power source configured to provide power supply to the DVR. The power source may be AC power or a battery integrated with the DVR. The DVR 310 may connect to the imaging device 320 via a cable or a wireless network. The cable may include a coaxial cable configured to transfer data and/or power. The wireless network may be configured to transfer data and/or power. The wireless network may facilitate communications between the DVR 310 and imaging device 320. The wireless network may be a single network, or a combination of various networks. Merely by way of example, the wireless network may include an intranet, an Internet, a local area network (LAN), a wide area network (WAN), a wireless local area network (WLAN), a metropolitan area network (MAN), a wide area network (WAN), a public telephone switched network (PSTN), a Bluetooth™ network, a ZigBee™ network, a near field communication (NFC) network, a global system for mobile communications (GSM) network, a code-division multiple access (CDMA) network, a time-division multiple access (TDMA) network, a general packet radio service (GPRS) network, an enhanced data rate for GSM evolution (EDGE) network, a wideband code division multiple access (WCDMA) network, a high speed downlink packet access (HSDPA) network, a long term evolution (LTE) network, a user datagram protocol (UDP) network, a transmission control protocol/Internet protocol (TCP/IP) network, a short message service (SMS) network, a wireless application protocol (WAP) network, a ultra wide band (UWB) network, an infrared ray, or the like, or any combination thereof. The wireless network may also include various network access points, e.g., wireless access points such as one or more base stations or Internet exchange points through which the DVR 310 or the imaging device 320 may connect to the wireless network in order to transmit video data and/or power.

The DVR 310 may be configured to receive and store video data. The DVR 310 may be further configured to detect a type of the imaging device 320 (e.g., a POC camera or a non-POC camera) which connects to the DVR 310, and determine a power supply mode based on the type of the imaging device 320.

The imaging device 320 may be configured to capture the video of an area and transmit the video to the DVR 310 via the cable or the wireless network. The imaging device 320 may include a static camera, a pan-tilt-zoom camera, a moving camera, a stereoscopic camera, a structured light camera, a time-of-flight camera, an infrared camera, etc. The imaging device 320 may be a POC camera or a non-POC camera. In some embodiments, the imaging device 320 may be a POC camera. When the POC camera connects to the DVR, the POC camera may get power supply from the DVR and then start to capture the video. In some embodiments, the imaging device 320 may be a non-POC camera. The non-POC camera may include a separate power source such as an AC power or a battery, and the non-POC camera may get power supply from the separate power source and capture the video. When the non-POC camera connects to the DVR, the non-POC camera may directly transmit the video to the DVR.

The DVR 310 may include a processor 311, a storage 312, and a communication port 313. The processor 311 may be configured to detect a type of the imaging device 320 (e.g., a POC camera or a non-POC camera), and determine a power supply mode based on the type of the imaging device 320. Merely by way of example, the processor 311 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof. Details of the processor 311 may be described in the present disclosure. See, e.g., FIG. 4 and the descriptions thereof.

The storage 312 may be configured to receive and store video data. In some embodiments, the video data may be transmitted to the processor 311 first, and then transmitted to storage 312 for storing. The storage 312 may store data and/or instructions. The data may include a video, relevant information of the video, etc. In some embodiments, the storage 312 may store data and/or instructions that the DVR 310 may execute or use to perform exemplary processes described in the present disclosure. In some embodiments, the storage 312 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage 312 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

The communication port 313 may establish connections between the DVR 310, the imaging device 320, and/or any other devices of the video surveillance system 300, and transfer video data via the connection. The communication port 313 may receive video data from the imaging device 320 and then transmit the video data to the processor 311 and/or the storage 312. The connection may be a wired connection, a wireless connection, any other communication connection that can enable data transmission and/or reception, and/or any combination of these connections. The wired connection may include, for example, a coaxial cable, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee link, a mobile network link (e.g., 3G, 4G, 5G), or the like, or a combination thereof. The communication port 313 may be any type of wired or wireless network interface. Merely by way of example, the communication port 313 may include a coaxial cable port, a USB port, a COM port, a PS/2 port, an HDMI port, a VGA port, a cable network interface, a wireline network interface, an optical fiber network interface, a telecommunications network interface, an intranet interface, an internet interface, a local area network (LAN) interface, a wide area network (WAN) interface, a wireless local area network (WLAN) interface, a metropolitan area network (MAN) interface, a wide area network (WAN) interface, a public telephone switched network (PSTN) interface, a Bluetooth network interface, a ZigBee network interface, a near field communication (NFC) network interface, or the like, or any combination thereof. In some embodiments, the communication port 313 may be implemented according to programming and/or computer language(s). The communication port 313 may include circuitry for coupling the DVR 310 to one or more networks, and is constructed for use with one or more communication protocols and technologies including, global system for mobile communications (GSM), code-division multiple access (CDMA), time-division multiple access (TDMA), general packet radio service (GPRS), enhanced data rate for GSM evolution (EDGE), wideband code division multiple access (WCDMA), high speed downlink packet access (HSDPA), long term evolution (LTE), user datagram protocol (UDP), transmission control protocol/Internet protocol (TCP/IP), short message service (SMS), wireless application protocol (WAP), ultra wide band (UWB), IEEE 802.16 worldwide interoperability for microwave access (WiMax), session initiated protocol/real-time transport protocol (SIP/RTP), or any of a variety of other wireless communication protocols. In some embodiments, the communication port 313 may be and/or include a standardized communication port, such as RS232, RS485, etc. In some embodiments, the communication port 225 may be a specially designed communication port.

It should be noted that the descriptions above in relation to the video surveillance system 300 is provided for the purposes of illustration, and not intended to limit the scope of the present disclosure. For persons having ordinary skills in the art, various variations and modifications may be conducted under the guidance of the present disclosure. However, those variations and modifications do not depart the scope of the present disclosure. For example, the video surveillance system 300 may further include a terminal connected to or communicate with the DVR 310 and/or the imaging device 320. The terminal 130 may allow one or more operators (e.g., a user) to control the DVR 310 and/or the imaging device 320. For example, the operator may control the imaging device 320 via the terminal and may read the video data. The terminal may include an input device, an output device, a control panel, a display, or the like, or a combination thereof. Similar modifications should fall within the scope of the present disclosure.

FIG. 4 is a schematic diagram illustrating an exemplary processor according to some embodiments of the present disclosure. The processor 311 may include a processing module 410, a detection module 420, a power supply switch 430, and a mode switch module 440.

The processing module 410 may be configured to control other modules of the processor 311. In some embodiments, the processing module 410 may receive the video data from the communication port 313, and then transmit the video data to the storage 312. The processing module 410 may also process the received video data and then transmit the processed video data to the storage 312. The processing module 410 may determine whether there is video data received by the communication port 313. In some embodiments, the processing module 410 may control the detection module 420, power supply switch 430, or mode switch module 440. For example, the processing module 410 may control the detection module 420 to determine an operating voltage of the imaging device 320. The processing module 410 may control the power supply switch 430 to turn on in order to provide power supply to the imaging device 320 via the communication port 313, or control the power supply switch 430 to turn off based on the operating voltage of the imaging device 320. In some embodiments, the processing module 410 may control the mode switch module 440 to switch to a power supply mode or a non-power supply mode. Details of the processing module 410 may be described in the present disclosure. See, e.g., FIG. 5 and the descriptions thereof.

The detection module 420 may be configured to detect an operating voltage of the imaging device 320. The operating voltage of the imaging device 320 may be referred to a voltage across the imaging device 320 in a circuit. The detection module 420 may include a series circuit connecting to the communication port 313. When the imaging device 320 connects to the communication port 313 of the DVR 310, the imaging device 320 may detect the operating voltage of the imaging device 320. In some embodiments, the detection module 420 may detect the operating voltage of the imaging device 320 and transmit the operating voltage of the imaging device 320 to the processing module 410. Details of the detection module 420 may be described in the present disclosure. See, e.g., FIG. 6 and the descriptions thereof.

The power supply switch 430 may be configured to control power supply to the imaging device 320 via the communication port 313. The power supply switch 440 may include a power switch. When the power supply switch 430 is turned on, the DVR 310 may provide power supply to the imaging device 320 via the communication port 313. When the power supply switch 430 is turned off, the DVR 310 may not provide power supply to the imaging device 320.

The mode switch module 440 may be configured to switch the DVR 310 to a power supply mode or a non-power supply mode. When the power supply switch 430 is turned on, the mode switch module 440 may switch to the power supply mode. When the power supply switch 430 is turned off, the mode switch module 440 may switch to the non-power supply mode. Details of the mode switch module 440 may be described in the present disclosure. See, e.g., FIG. 7 and the descriptions thereof.

Modules of the processor 311 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. For example, the power supply switch 430 and the mode switch module 440 may be combined into a single module that may be configured to control power supply to the imaging device 320 and switch the DVR 310 to a power supply mode or a non-power supply mode.

Figure 5:
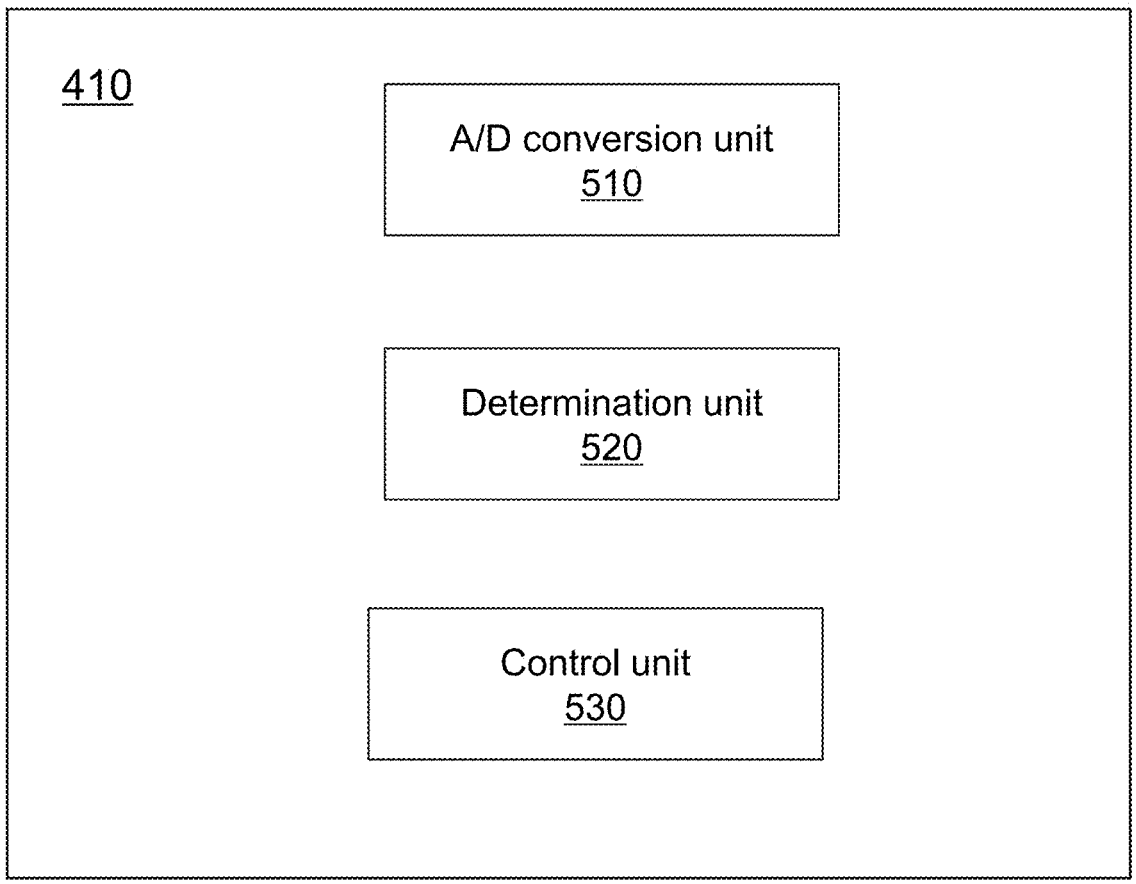
FIG. 5 is a schematic diagram of an exemplary processing module according to some embodiments of the present disclosure.

FIG. 5 is a schematic diagram illustrating an exemplary processing module according to some embodiments of the present disclosure. As illustrated in FIG. 5, the processing module 410 may include an A/D conversion unit 510, a determination unit 520, and a control unit 530.

The A/D conversion unit 510 may be configured to receive analog video signal from the communication port 313 and convert the analog video signal to digital video signal. The A/D conversion unit 510 may include a direct-conversion ADC, a successive-approximation ADC, a ramp-compare ADC, a Wilkinson ADC, an integrating ADC, a delta-encoded ADC, a pipeline ADC, a sigma-delta ADC, or the like, or a combination thereof. In some embodiments, the A/D conversion unit 510 may transmit the digital video signal to the processing module 410 (e.g., the determination unit 520 and/or the control unit 530) and/or the storage 312. In some embodiments, the A/D conversion unit 510 may also connect to the detection module 420 and/or the mode switch module 440. In some embodiments, the A/D conversion unit 510 may be removed from the DVR 310 and/or integrated to the imaging device 320. For example, the imaging device 320 may convert the analog video signal to digital video signal, and transmit the digital video signal to the DVR 310 via the cable. In some embodiments, the imaging device 320 may generate digital video signal directly and transmit the digital video signal to the DVR 310.

The determination unit 520 may be configured to determine whether there is video data received by the DVR 310. For example, the determination unit 520 may connect to the A/D conversion unit 510 or the communication port 313 and determine whether there is video data received by the communication port 313. The determination unit 520 may further process the video data and transmit the processed video data to the storage 312. Alternatively, the determination unit 520 may transmit the video data to the storage 312 without processing. In some embodiments, the determination unit 520 may constantly detect whether there is video data received until the communication port 313 fails to receive the video data. As long as the imaging device 320 is connected to the DVR 310 and get power supply, the imaging device 320 may constantly capture video data and transmit the video data to the DVR 310. In some embodiments, the imaging device 320 may be disconnected from the DVR 310 because of broken and a new imaging device 320 may be connected to the DVR 310. In this situation, the determination unit 520 may determine that the DVR 310 fails to receive video data when exchanging the imaging device 320. In some embodiments, the determination unit 520 may include a main control unit (MCU). The determination unit 520 may transmit the determination result to the control unit 530.

The control unit 530 may be configured to control other modules of the processor 311. In some embodiments, the control unit 530 may connect to the detection module 420, the power supply switch 430, and the mode switch module 440 and control these modules. For example, when the determination unit 520 determines that the DVR 310 successfully receiving video data, the control unit 530 may control other modules (e.g., A/D conversion unit 510, detection module 420, power supply switch 430, and mode switch module 440) to remain their respective status. When the determination unit 520 determines that the DVR 310 fails to receive video data, e.g., a previously connected imaging device 320 may be disconnected from the DVR 310, the control unit 530 may control the power supply switch 430 to reset to turn off status, and control the mode switch module 440 to reset to the non-power supply mode. The control unit 530 may also control the detection module 420 to detect an operating voltage of a newly connected imaging device 320. The control unit 530 may further determine whether the operating voltage of the imaging device 320 is in a predetermined voltage range and control the power supply switch 430 and mode switch module 440 based on the determination. In some embodiments, if the operating voltage of the imaging device 320 is within the predetermined voltage range, the control unit 530 may control the power supply switch 430 to turn on to provide power supply to the imaging device 320, and control the mode switch module 440 to switch to the power supply mode. In some embodiments, if the operating voltage of the imaging device 320 is outside the predetermined voltage range, the control unit 530 may control the power supply switch 430 and mode switch module 440 to remain current status. In some embodiments, the control unit 530 may include a single chip microcomputer (SCM).

Units of the processing module 410 may be connected to or communicate with each other via a wired connection or a wireless connection. The wired connection may include a metal cable, an optical cable, a hybrid cable, or the like, or any combination thereof. Two or more of the units may be combined into a single unit, and any one of the units may be divided into two or more sub-units.

Figure 6:
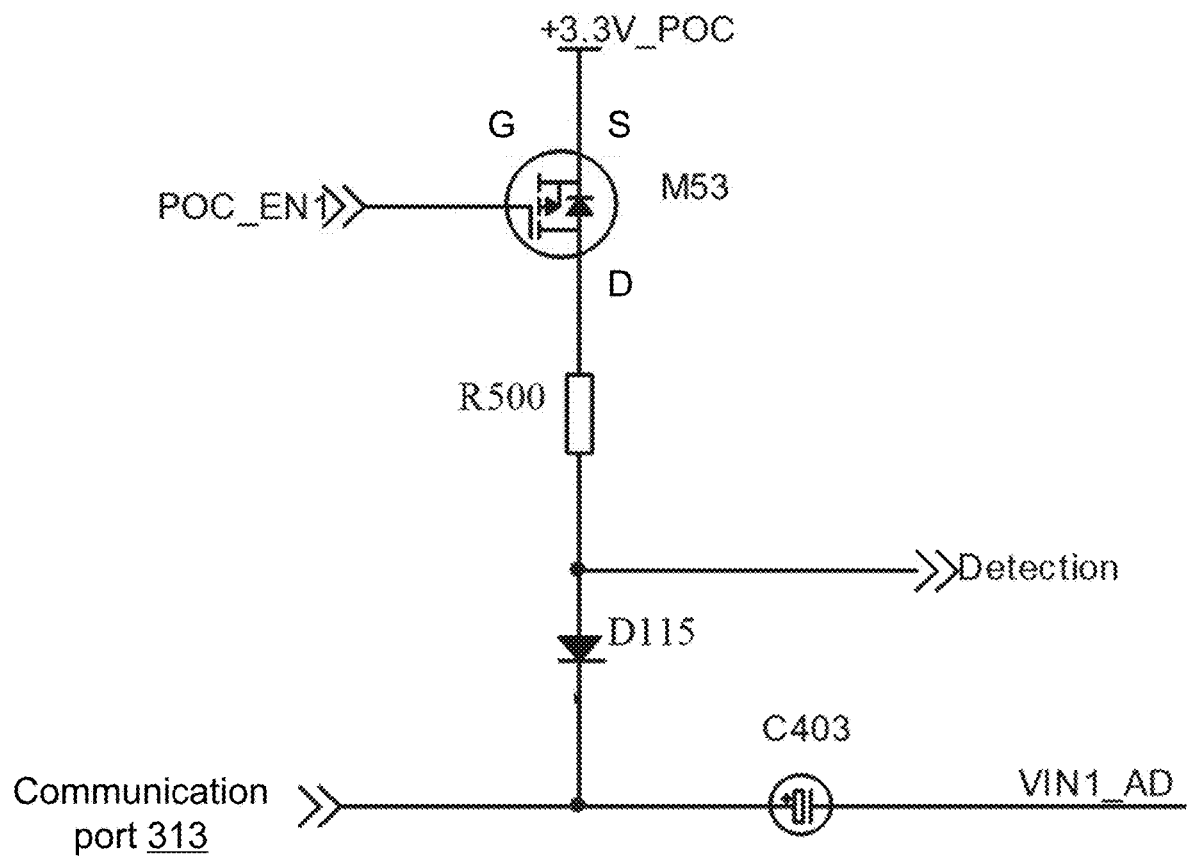
FIG. 6 is a schematic circuit illustrating an exemplary detection module according to some embodiments of the present disclosure.

FIG. 6 is a schematic circuit illustrating an exemplary detection module according to some embodiments of the present disclosure. As illustrated in FIG. 6, the detection module 420 may include a Metal Oxide Semi-Conductor Field Effect Transistor (MOS FET) M53, a first resistor R500, a diode D115, a DC blocking capacitor C403, and a first power source.

The gate of the MOS FET M53 may connect to the control unit 530 (e.g., the SCM). The source of the MOS FET M53 may connect to the first power source (which may be a DC power source of 3.3 volt). The drain of the MOS FET M53 may connect to a first end of the first resistor R500. A second end of the first resistor R500 may connect to the anode of the diode D115. The cathode of the diode D115 may connect to the communication port 313. The cathode of the diode D115 may also connect to a first end of the capacitor C403. A second end of the capacitor C403 may connect to the processing module 410, e.g., the A/D conversion unit 510, the determination unit 520, and/or the control unit 530. In some embodiments, the capacitor C403 may include an electrolytic capacitor.

When the determination unit 520 determines that the DVR 310 (e.g., the communication port 313) fails to receive video data, the control unit 530 may control the POC_EN1 to provide an appropriate voltage to the gate of the MOS FET M53, thus the source and the drain of the MOS FET M53 are conducted. The first resistor R500 and the imaging device 320 connecting to the communication port 313 may be conducted in a series connection circuit and divide the voltage of the first power source. Then the control unit 530 may sample signals at the anode of the diode D115 and determine the operating voltage of the imaging device 320 based on the sampled signals. When the determination unit 520 determines that the DVR 310 is receiving video data, the control unit 530 may control the POC_EN1 to not provide a voltage to the gate of the MOS FET M53, thus the MOS FET M53 is turned off and the source and the drain are not conducted.

The diode D115 may be used to protect the circuit due to a high voltage of the imaging device 320 relative to the first power source. In some embodiments, other protection approaches may be used to protect the circuit, and the diode D115 may be omitted from the detection module 430. It should be noted that the above description of the detection module 420 is merely provided for the purposes of illustration, and not intended to be understood as the only embodiment. For persons having ordinary skills in the art, various variations and modifications may be conduct under the teaching of some embodiments of the present disclosure. In some embodiments, some components may be reduced or added. However, those variations and modifications may not depart from the protecting of some embodiments of the present disclosure. For example, one or more other resistors may be added in the detection module 420.

Figure 7:
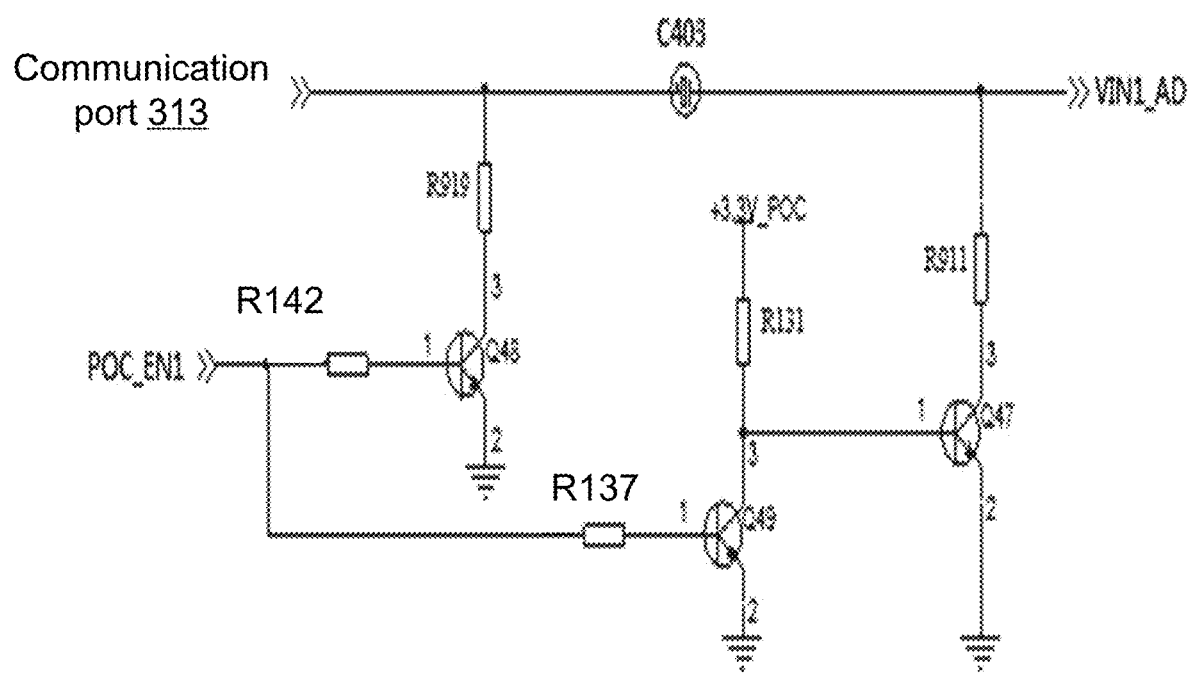
FIG. 7 is a schematic circuit illustrating an exemplary mode switch module according to some embodiments of the present disclosure.

FIG. 7 is a schematic circuit illustrating an exemplary mode switch module according to some embodiments of the present disclosure. As illustrated in FIG. 7, the mode switch module 450 may include a second resistor R919, a first triode Q48, a third resistor R142, a fourth resistor R137, a second triode Q49, a fifth resistor R131, a third triode Q47, a sixth resistor R911, and a second power source (which may be a DC power source of 3.3 volt).

As described in FIG. 6, the communication port 313 may connect to a first connection node between the cathode of the diode D115 and the first end of the capacitor C403. A first end of the second resistor R919 may also connect to the first connection node. A second end of the second resistor R919 may connect to the collector of the first triode Q48, the second end of the second resistor R919 being opposite to the first end of the second resistor R919. The emitter of the first triode Q48 may be grounded. The base of the first triode Q48 may connect to a first end of the third resistor R142. A second end of the third resistor R142 may connect to a first end of the fourth resistor R137. A second connection node between the third resistor R142 and the fourth resistor R137 may be connected to the control unit 520. A second end of the fourth resistor R137 may connect to the base of the second triode Q49, and the emitter of the second triode Q49 may be grounded. The collector of the second triode Q49 may be connect to a first end of the fifth resistor R131. A second end of the fifth resistor R131 may connect to the second power source. A third connection node between the collector of the second triode Q49 and the fifth resistor R131 may connect to the base of the third triode Q47. The emitter of the third triode Q47 may be grounded. The collector of the third triode Q47 may connect to a first end of the sixth resistor R911, and a second end of the sixth resistor R911 may connect to the second end of the capacitor C403 in the detection module 420. A fourth connection node between the sixth resistor R911 and the capacitor C403 may connect to the processing module 410, e.g., the A/D conversion unit 510, the determination unit 520, and/or the control unit 530.

The mode switch module 440 may include a power supply mode or a non-power supply mode. When the mode switch module 440 is switched to the power supply mode, the control unit 530 may provide a relative low voltage to turn off the first triode Q48 and second triode Q49. The voltage of the third connection node is substantially the same with the second power source, i.e., 3.3 V, which may turn on the third triode Q47 to conduct the collector and the emitter. The analog video signal (AC signal) from the communication port 313 may pass through the capacitor C403 and ground via the sixth resistor R911. The amplitude of the analog video signal may be controlled in the specification to ensure that the video data can be decoded correctly.

When the mode switch module 440 is switched to the non-power supply mode, the control unit 530 may provide a relative high voltage to turn on the first triode Q48 and second triode Q49, such that the collector of the second triode Q49 and the emitter of the second triode Q49 are conducted, and the voltage of the third connection node is substantially the same with the ground, i.e., 0 V, which may not turn on the third triode Q47 to conduct the collector and the emitter. The analog video signal (AC signal) from the communication port 313 may ground via the second resistor R919 before pass through the capacitor C403. The amplitude of the analog video signal from POC camera and non-POC camera may be controlled to be consistent by adjusting the resistance of the sixth resistor R911 and the resistance of the second resistor R919.

The capacitor C403 may avoid damage to the imaging device 320 by isolating the direct current (DC) input to the imaging device 320 when the mode switch module 440 is in the power supply mode. Besides, in some embodiments of the present invention, since the POC camera requires a high-amplitude DC power supply from the DVR 310, when the power supply mode is switched to the non-power supply mode, the power stored in the capacitor C403 is drained to avoid damage to non-POC camera. In addition, when the imaging device 320 is a POC camera, the circuit of the mode switch module 440 in the power supply mode corresponding to the POC camera is placed behind the capacitor C403, which can prevent the overall power consumption from rising when the load is ground.

It should be noted that the above description of the mode switch module 440 is merely provided for the purposes of illustration, and not intended to be understood as the only embodiment. For persons having ordinary skills in the art, various variations and modifications may be conduct under the teaching of some embodiments of the present disclosure. In some embodiments, some components may be reduced or added. However, those variations and modifications may not depart from the protecting of some embodiments of the present disclosure. For example, the first triode Q48 may be replaced with a MOS FET.

Figure 8:
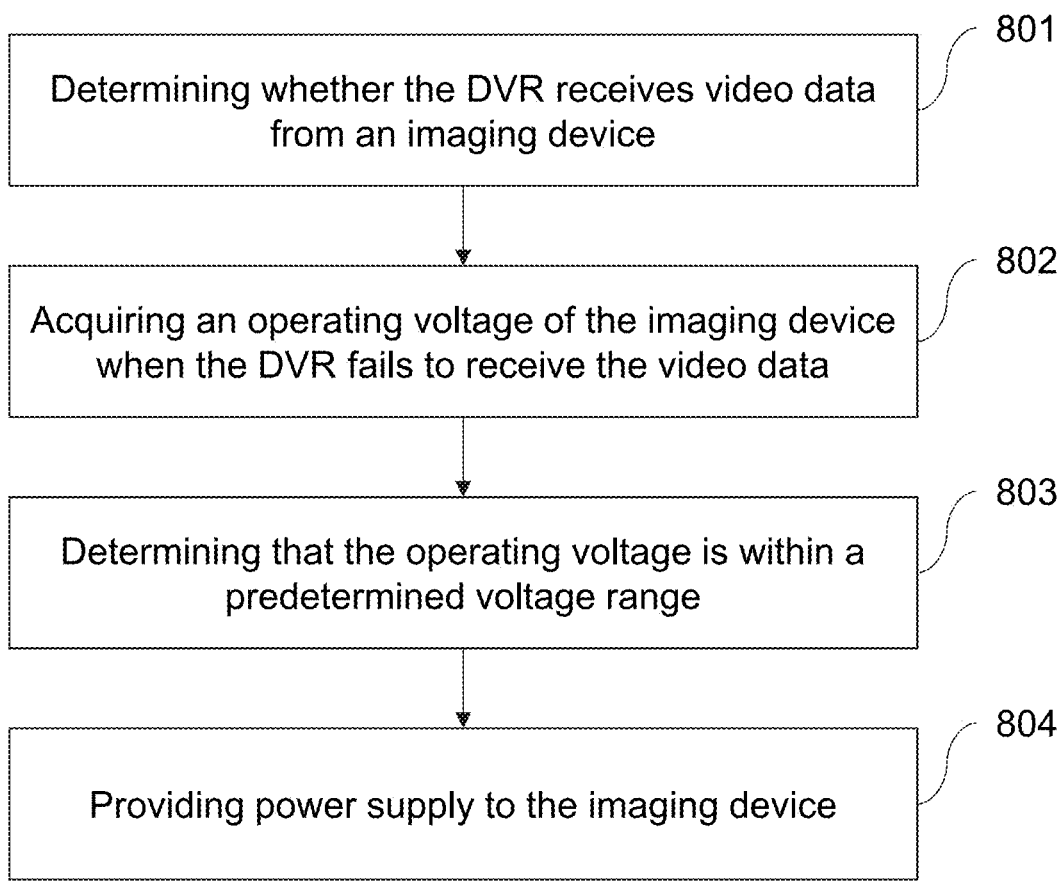
FIG. 8 is a flow chart illustrating an exemplary process for providing power supply to an imaging device according to some embodiments of the present disclosure.

FIG. 8 is a flow chart illustrating an exemplary process for providing power supply to an imaging device according to some embodiments of the present disclosure. The process 800 may be executed by the DVR 310. For example, the process 800 may be implemented as a set of instructions stored in the storage 312. The processor 311 in FIG. 3 may execute the set of instructions, and when executing the instructions, the processor 311 and/or the modules/units may be configured to perform the process 800. The operations of the illustrated process presented below are intended to be illustrative. In some embodiments, the process 800 may be accomplished with one or more additional operations not described and/or without one or more of the operations discussed. Additionally, the order in which the operations of the process 800 as illustrated in FIG. 8 and described below is not intended to be limiting.

In 801, the processing module 410 (e.g., the determination unit 520) may determine whether the DVR 310 receives video data from the imaging device 320 through the communication port 313. In some embodiments, as long as the DVR 310 is powered on, the processing module 410 may constantly determine whether there is video data received. The video data transmitted from the imaging device 320 may be analog signal or may be digital signal (e.g. converted from analog signal by the A/D conversion unit 510). The video data may be cached in the A/D conversion unit 510 and the processing module 410 may access the A/D conversion unit 510 and determine whether the A/D conversion unit 510 receives the video data. In some embodiments, the video data may be transmitted to the processing module 410 directly. For example, the processing module 410 may determine whether there is video data in the A/D conversion unit 510 based on I2C signal. If there is video data in the A/D conversion unit 510, the processing module 410 may determine that the communication port 313 receives the video data. If there is not video data in the A/D conversion unit 510, the processing module 410 may determine that the communication port 313 fails to receive the video data.

In some embodiments, when a previous imaging device 320 is connected to the communication port 313, it may constantly transmit video data to the DVR 310, thus the processing module 410 may always determine that the communication port 313 receives video data. When the previous imaging device 320 is disconnected from the communication port 313, the processing module 410 may determine that the communication port 313 fails to receive video data.

In 802, if the processing module 410 determines that the communication port 313 fails to receive the video data, the processing module 410 (e.g., the control unit 530) may acquire an operating voltage of the imaging device 320 via the communication port 313. The operating voltage of the imaging device 320 may refer to a voltage across the imaging device 320 when connected to a series circuit. The imaging device 320 may be serially connected with a known resistor in a series circuit when it connects to the communication port 313 and use part of a voltage of a power source. In some embodiments, the processing module 410 may acquire the operating voltage of the imaging device 320 via the detection module 420. For example, as shown in FIG. 6, the processing module 410 may turn on the MOS FET M53 by providing a relative high voltage to the gate of the MOS FET M53 and thus conduct the source and the drain of the MOS FET M53. Then the processing module 410 may sample signals from a connection node between the first resistor R500 and the diode D115 to determine the operating voltage of the imaging device 320.

In some embodiments, if the processing module 410 determines that the communication port 313 fails to receive the video data, the processing module 410 (e.g., the control unit 530) may further reset the DVR 310 to a non-POC mode. The non-POC mode may include turning off the power supply switch 430 and switching the mode switch module 440 to the non-power supply mode. For example, the processing module 410 may check the status of the power supply switch 430 and mode switch module 440. If the power supply switch 430 is power on, the processing module 410 may control the power supply switch 430 to turn off, otherwise it remains. If the mode switch module 440 is in the power supply mode, the processing module 410 may control the mode switch module 440 to switch to the non-power supply mode, otherwise it remains. In some embodiments, the reset process may be executed before or after the operation of acquiring the operating voltage of the imaging device 320, or may be executed simultaneously.

In 803, the processing module 410 (e.g., the control unit 530) may determine whether the operating voltage of the imaging device 320 is within a predetermined voltage range. In some embodiments, the imaging device 320 may include a POC camera or a non-POC camera. The POC camera may not only transmit the video data to the DVR 310 through the communication port 313, for example, via a coaxial cable, but also get power supply from the DVR 310 through the communication port 313 via, for example, the coaxial cable. The non-POC camera may only transmit the video data to the DVR 310 through the communication port 313 via, for example, a coaxial cable. A resistance of the POC camera and a resistance of the non-POC camera is different due to difference circuit structures, resulting a different dividing voltage relative to the same first resistor R500. In some embodiments, with respect to a specific first resistor R500 and a specific first power source (e.g., 3.3V), a predetermined voltage range may indicate that the currently connected apparatus is a POC camera. The predetermined voltage range may be obtained in advance by, for example, connecting various POC cameras to the DVR 310, and detecting the operating voltage of each POC camera.

For example, the predetermined voltage range is [2 V, 2.5 V]. If a first apparatus is connected to the DVR 310, and the operating voltage of the first apparatus is 2.3 V, then the processing module 410 may determine that the operating voltage of the first apparatus is within the predetermined voltage range, which indicates that the first apparatus may be a POC camera. If a second apparatus is connected to the DVR 310, and the operating voltage of the second apparatus is 1.8 V, then the processing module 410 may determine that the operating voltage of the second apparatus is outside the predetermined voltage range, which indicates that the second apparatus may be a non-POC camera.

In 804, if the operating voltage of the imaging device 320 is within the predetermined voltage range, the processing module 410 may provide power supply to the imaging device 320 via the communication port 313. In some embodiments, the processing module 410 (e.g., the control unit 530) may turn on the power supply switch 430 to supply power to the imaging device 320 via the communication port 313. In some embodiments, the processing module 410 (e.g., the control unit 530) may further control the mode switch module 440 to switch to the power supply mode.

If the operating voltage of the imaging device 320 is outside the predetermined voltage range, the processing module 410 may not provide power supply to the imaging device 320. In some embodiments, the processing module 410 (e.g., the control unit 530) may turn off the power supply switch 430 to not supply power to the imaging device 320, or control the power supply switch 430 to remain the off status. In some embodiments, the processing module 410 (e.g., the control unit 530) may further control the mode switch module 440 to switch to the non-power supply mode, or control the mode switch module 440 to remain the non-power supply mode.

It should be noted that the above description of process 800 is merely provided for the purposes of illustration, and not intended to be understood as the only embodiment. For persons having ordinary skills in the art, various variations and modifications may be conduct under the teaching of some embodiments of the present disclosure. In some embodiments, some operations may be reduced or added. However, those variations and modifications may not depart from the protecting of some embodiments of the present disclosure. For example, one or more other optional operations (e.g., a reset operation) may be added in the process 800. In the reset operation, the processing module 410 may check the status of the power supply switch 430 and mode switch module 440, turn off the power supply switch 430 if it is open, and switch the mode switch module 440 to the non-power supply mode if it is in the power-supply mode.

Figure 9:
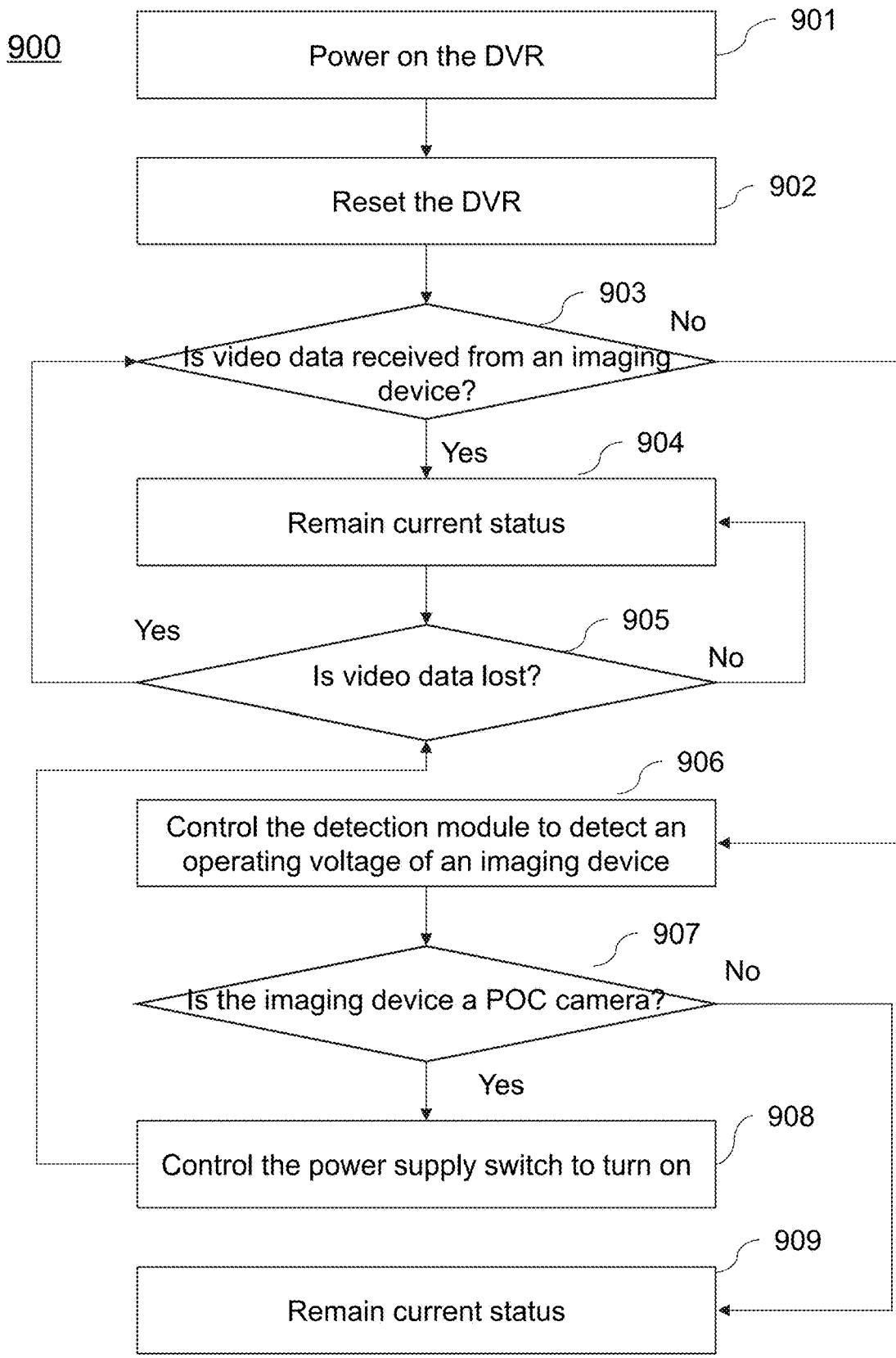
FIG. 9 is a flow chart illustrating another exemplary process for providing power supply to an imaging device according to some embodiments of the present disclosure.

FIG. 9 is a flow chart illustrating another exemplary process for providing power supply to an imaging device according to some embodiments of the present disclosure. The process 900 may be executed by the DVR 310. For example, the process 900 may be implemented as a set of instructions stored in the storage 312. The processor 311 in FIG. 3 may execute the set of instructions, and when executing the instructions, the processor 311 and/or the modules/units may be configured to perform the process 900. The operations of the illustrated process presented below are intended to be illustrative. In some embodiments, the process 900 may be accomplished with one or more additional operations not described and/or without one or more of the operations discussed. Additionally, the order in which the operations of the process 900 as illustrated in FIG. 9 and described below is not intended to be limiting.

In 901, the DVR 310 may be powered on by a user. For example, the DVR 310 may include a power button. The user may turn on the power button thus the DVR 310 may get power supply from for example AC power or a battery and start to work.

In 902, the DVR 310 may reset to a default status. In some embodiments, the default status may include that the power supply switch 430 is off, the mode switch module 440 is in the non-power supply mode.

In 903, the DVR 310 (e.g., the processing module 410, the determination unit 520) may determine whether the DVR 310 receives video data from an imaging device 320 connected to the DVR 310 through the communication port 313. If the DVR 310 receives the video data, the process 900 may proceed to 904, otherwise it proceed to 906.

In 904, the DVR 310 may remain the current status. In some embodiments, if the DVR receives the video data, which indicates that the imaging device 320 connected to the DVR 310 can work, the imaging device 320 does not need to get power supply from the DVR 310. Accordingly, the DVR 310 may remain the default status, and does provide power supply to the imaging device 320 via the communication port 313 in 904.

In 905, the DVR 310 may determine whether the video data is lost. In some embodiments, the imaging device 320 may be disconnected from the DVR 310 due to for example broken, and a new imaging device 320 may be connected to the DVR 310, resulting the loss of the video data. If the video data is lost, the process 900 is proceed to 903, otherwise it proceed to 904.

In 906, the DVR 310 (e.g., the processing module 410, the control unit 530) may control the detection module 420 to detect an operating voltage of the imaging device 320 via the communication port 313. In some embodiments, if the DVR 310 fails to receive the video data through the communication port 313, it may indicate that the imaging device 320 connected to DVR 310 may be a POC camera or other reasons.

In 907, the DVR 310 (e.g., the processing module 410, the control unit 530) may determine whether the imaging device 320 is a POC camera based on the operating voltage of the imaging device 320 and a predetermined voltage range. In some embodiments, the DVR 310 may determine that the imaging device 320 is a POC when the operating voltage of the imaging device 320 is within the predetermined voltage range. In some embodiments, the DVR 310 may determine that the imaging device 320 is not a POC camera (e.g., a non-POC camera) when the operating voltage of the imaging device 320 is outside the predetermined voltage range. If the imaging device 320 is a POC camera, the process 900 may proceed to 908, otherwise it may proceed to 909.

In 908, the DVR 310 (e.g., the processing module 410, the control unit 530) may turn on the power supply switch 430 to provide power supply to the imaging device 320 via the communication port 313. In some embodiments, the power supply may be a DC power of 48 volt. In some embodiments, the DVR 310 (e.g., the processing module 410, the control unit 530) may further control the mode switch module 440 to switch a power supply mode. In this status, the imaging device 320 connected to the DVR 310 may get power supply from the DVR 310 and thus may capture and transmit the video data to the DVR 310. The DVR 310 may constantly determine if the video data is lost, as the process 900 proceed to 905.

In 909, the DVR 310 may remain the current status. In some embodiments, if the DVR fails to receive the video data and the imaging device 320 is not a POC camera, which indicates that there may be some other reasons. The DVR 310 may further generate a prompt information to remind the user to check. For example, the prompt information may include an audio signal or text information. In some embodiments, the prompt information may be send to a terminal connected to the DVR 310 via the communication port 313.

It should be noted that the above description of process 900 is merely provided for the purposes of illustration, and not intended to be understood as the only embodiment. For persons having ordinary skills in the art, various variations and modifications may be conduct under the teaching of some embodiments of the present disclosure. In some embodiments, some operations may be reduced or added. However, those variations and modifications may not depart from the protecting of some embodiments of the present disclosure. For example, one or more other optional operations may be added in the process 900.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed object matter requires more features than are expressly recited in each claim. Rather, claim object matter lie in less than all features of a single foregoing disclosed embodiment.

I claim:

1. A digital video recorder (DVR) for storing video data received from an imaging device, comprising:
  a communication port configured to connect to the imaging device;
  a processor configured to determine whether the DVR receives video data from the imaging device through the communication port and acquire an operating voltage of the imaging device, the processor including a detection module, and the detection module including a metal oxide semi-conductor field effect transistor (MOS FET), a first resistor, a diode, a capacitor, and a first power source, wherein
    a gate of the MOS FET connects to the processing module;
    a source of the MOS FET connects to the first power source;
    a drain of the MOS FET connects to a first end of the first resistor;
    a second end of the first resistor connects to an anode of the diode;
    a cathode of the diode connects to a first connection node between the communication port and the capacitor; and
  a power supply switch configured to turn on or off a power supply to the imaging device based on a determination by the processor and the operating voltage of the imaging device.

2. The DVR of claim 1, wherein the communication port connects to the imaging device via a coaxial cable or a wireless network.

3. The DVR of claim 1, wherein the processor is further configured to switch the DVR to a power supply mode or a non-power supply mode.

4. The DVR of claim 3, wherein the processor further includes a processing module configured to determine whether the DVR receives video data from the imaging device through the communication port, the processing module including an A/D conversion unit configured to convert analog video data to digital video data.

5. The DVR of claim 3, wherein the processor further includes a processing module, the processing module comprising a main control unit (MCU) and a single chip microcomputer (SCM), the MCU being configured to determine whether the DVR receives the video data.

6. The DVR of claim 5, the MCU further configured to process the video data.

7. The DVR of claim 6, the SCM configured to control the power supply switch to reset to turn off in response to that the MCU determines that the DVR fails to receive the video data.

8. The DVR of claim 7, the SCM configured to control the DVR to reset to the non-power supply mode.

9. The DVR of claim 5, wherein the SCM is configured to control the detection module to acquire the voltage of the imaging device in response to that the MCU determines that the DVR fails to receive the video data and determine whether the voltage of the imaging device is within the predetermined voltage range.

10. The DVR of claim 9, the SCM configured to control the power supply switch to turn on if the SCM determines that the voltage of the imaging device is within the predetermined voltage range.

11. The DVR of claim 10, the SCM configured to control the DVR to switch to the power supply mode.

12. The DVR of claim 1, wherein the processor further includes a mode switch module configured to switch the DVR to the power supply mode or the non-power supply mode, and the mode switch module includes a second resistor, a first triode, a third resistor, a fourth resistor, a second triode, a fifth resistor, a third triode, a sixth resistor, and a second power source, and wherein
  a first end of the second resistor connects to the first connection node;
  a second end of the second resistor connects to a collector of the first triode;
  an emitter of the first triode is grounded;

a base of the first triode connects to a first end of the third resistor;

a second end of the third resistor connects to a first end of the fourth resistor;

a second connection node between the third resistor and the fourth resistor connects to the processing module;

a second end of the fourth resistor connects to a base of the second triode;

an emitter of the second triode is grounded;

a collector of the second triode connects to a first end of the fifth resistor;

a second end of the fifth resistor connects to the second power source;

a third connection node between the collector of the second triode and the fifth resistor connects to a base of the third triode;

an emitter of the third triode is grounded;

a collector of the third triode connects to a first end of the sixth resistor;

a second end of the sixth resistor connects to a fourth connection node between the processing module and the capacitor.

13. The DVR of claim 12, wherein
the non-power supply mode includes that ground the video data at the first connection node via the second resistor;
the power supply mode includes that ground the video data at the fourth connection node via the sixth resistor.

14. The DVR of claim 13, wherein a first resistance of the second resistor is the same with a second resistance of the sixth resistor.

15. A method implemented on a digital video recorder (DVR) including a processor, comprising:
determining, by the processor, whether the DVR receives video data from an imaging device connected to the DVR;
acquiring, by the processor, an operating voltage of the imaging device in response to determining that the DVR fails to receive the video data;
determining, by the processor, that the operating voltage of the imaging device is within a predetermined voltage range; and
controlling, by the processor, the DVR to provide power supply to the imaging device, wherein
the processor includes a detection module, and the detection module includes a metal oxide semi-conductor field effect transistor (MOS FET), a first resistor, a diode, a capacitor, and a first power source, wherein
a gate of the MOS FET connects to the processing module;
a source of the MOS FET connects to the first power source;
a drain of the MOS FET connects to a first end of the first resistor;
a second end of the first resistor connects to an anode of the diode;
a cathode of the diode connects to a first connection node between the communication port and the capacitor.

16. The method of claim 15, further comprising:
resetting, by the processor, the DVR to not provide power supply to the imaging device when the DVR is powered on or in response to determining that the DVR fails to receive the video data.

17. The method of claim 15, further comprising:
controlling, by the processor, the DVR to switch to a power supply mode, wherein the power supply mode includes that ground the video data at a connection node between the processor and a communication port of the DVR via a resistor.

18. The method of claim 17, wherein the communication port of the DVR is configured to connect to the imaging device via a coaxial cable or a wireless network.

19. The method of claim 17, further comprising:
resetting, by the processor, the DVR to switch to a non-power supply mode when the DVR is powered on or in response to determining that the DVR fails to receive the video data.

* * * * *